US011520685B2

(12) United States Patent
Raka et al.

(10) Patent No.: US 11,520,685 B2
(45) Date of Patent: Dec. 6, 2022

(54) SYSTEMS AND METHODS FOR AN END-TO-END AUTOMATION FRAMEWORK

(71) Applicant: FMR LLC, Boston, MA (US)

(72) Inventors: Kirankumar Raka, Morrisville, NC (US); Sean Callot, Durham, NC (US); Alex Thomas, Morrisville, NC (US); Vamsi Nallagatla, Cary, NC (US); Veena Radhakrishna, Bangalore (IN); Faris Jadadic, Bridgeport, CT (US); Christopher Addison, Cary, NC (US); Rajarajan Venkatesan, Chennai (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/339,482

(22) Filed: Jun. 4, 2021

(65) Prior Publication Data
US 2022/0276950 A1  Sep. 1, 2022

Related U.S. Application Data

(60) Provisional application No. 63/155,018, filed on Mar. 1, 2021.

(51) Int. Cl.
*G06F 11/36* (2006.01)
(52) U.S. Cl.
CPC .................. *G06F 11/3664* (2013.01)
(58) Field of Classification Search
CPC .................................................. G06F 11/3664
See application file for complete search history.

(56) References Cited

U.S. PATENT DOCUMENTS

| 10,061,687 | B2 |   | 8/2018 | Nagamalla et al. |
|---|---|---|---|---|
| 10,387,370 | B2 |   | 8/2019 | Shuster |
| 10,582,021 | B2 | * | 3/2020 | Tischart .................. H04L 43/50 |
| 10,776,253 | B2 | * | 9/2020 | Earanti .............. G06F 11/3688 |

(Continued)

FOREIGN PATENT DOCUMENTS

| CN | 106961362 B | * | 8/2018 | .......... G06F 11/3664 |
|---|---|---|---|---|
| CN | 108469998 B | * | 9/2021 | .......... G06F 11/3664 |

OTHER PUBLICATIONS

Yuan et al., "A general end-to-end diagnosis framework for manufacturing systems", Nov. 2019, National Science Review (Year: 2019).*

(Continued)

*Primary Examiner* — Wei Y Zhen
*Assistant Examiner* — Junchun Wu
(74) *Attorney, Agent, or Firm* — Cesari & McKenna, LLP

(57) ABSTRACT

Systems and methods for implementing an end-to-end automation framework. The method includes receiving a testing data file associated with applications. The method also includes initiating a first automation framework corresponding to a first application. The method further includes storing first data generated from the first automation framework in a data file. The method also includes initiating a second automation framework corresponding to a second application. The method further includes storing second data generated from the second automation framework based on at least the first data in the data file. The method also includes generating a data log based on the data file. The method further includes generating for display the data log on a user device.

20 Claims, 8 Drawing Sheets

(56) References Cited

U.S. PATENT DOCUMENTS

| | | | | |
|---|---|---|---|---|
| 2007/0220341 A1* | 9/2007 | Apostoloiu | G06F 11/3664 | 714/33 |
| 2011/0125448 A1* | 5/2011 | Jung | G06T 19/00 | 702/108 |
| 2013/0007522 A1* | 1/2013 | Kurapati | G06F 11/3664 | 714/E11.178 |
| 2014/0245070 A1* | 8/2014 | Rumble | G06F 11/3692 | 714/38.14 |
| 2015/0100832 A1* | 4/2015 | Nanjundappa | G06F 11/3664 | 714/38.14 |
| 2015/0309917 A1* | 10/2015 | Wang | G06F 11/3688 | 714/38.1 |
| 2016/0321166 A1* | 11/2016 | Totale | G06F 11/3692 | |
| 2019/0294527 A1* | 9/2019 | Teitelbaum | H04L 63/083 | |
| 2019/0340113 A1* | 11/2019 | Earanti | G06F 11/3688 | |
| 2020/0319995 A1* | 10/2020 | Mitra | G06F 11/3684 | |
| 2020/0327043 A1* | 10/2020 | Dyavappa | G06F 11/3688 | |
| 2021/0232498 A1* | 7/2021 | Zhang | G06F 11/3608 | |
| 2021/0279167 A1* | 9/2021 | Jose | G06F 11/3664 | |
| 2022/0066915 A1* | 3/2022 | Holt | G06F 11/3664 | |
| 2022/0147346 A1* | 5/2022 | Ahuja | G06F 8/71 | |

OTHER PUBLICATIONS

Sadiq et al., "A Method for the Selection of Software Testing Automation Framework using Analytic Hierarchy Process", Sep. 2014, International Journal of Computer Applications (Year: 2014).*

Ali et al., "A Proposed Framework for Full Automation of Software Testing Process", 2012, IEEE (Year: 2012).*

Zayas et al., "An End-to-End Automation Framework for Mobile Network Testbeds", 2019, Hindawi (Year: 2019).*

Leung et al., "Application of a mixed simulated annealing-genetic algorithm heuristic for the two-dimensional orthogonal packing problem", 2002, Elsevier (Year: 2002).*

Kim et al., "Implementing an Effective Test Automation Framework", 2009, IEEE (Year: 2009).*

* cited by examiner

500

```xml
<?xml version="1.0" encoding="UTF-8"?><SystemsTeam_XML>
    <Test Name="E2E_MULTI_DOSDTE" Status="Run">
        <BundleshortName>MultiAccountBundleSubmitionKiran</BundleshortName>
            <Account1>
            <Signer_FirstName>Kiran</Signer_FirstName>
            <Signer_MiddleName>dummy</Signer_MiddleName>
            <Signer_LastName>Raka</Signer_LastName>
            <Phone_No>3156403350</Phone_No>
            <Confirm_No>CNF54223222JUL20UAT</Confirm_No>
            <Account_No>637129213</Account_No>

<DTE_XTRAC_LoginCookie>1444336240984073368633747227104 6750984</DTE_XTRAC_LoginCookie>
            <DTE_TC1_L1>W237234-30SEP20</DTE_TC1_L1>
            <DTE_TC1_L2_ES1>W919607-08DEC20</DTE_TC1_L2_ES1>
            <DTE_TC1_L3_AO1>W919608-08DEC20</DTE_TC1_L3_AO1>
            <DTE_TC1_L3_PB1>W919609-08DEC20</DTE_TC1_L3_PB1>
            <DTE_TC1_L3_TCP1>W919610-08DEC20</DTE_TC1_L3_TCP1>
            <DTE_TC1_L3_TCP2>W238452-01OCT20</DTE_TC1_L3_TCP2>
            <DTE_TC1_L3_TCP3>W237253-Dummy</DTE_TC1_L3_TCP3>
            <DTE_TC1_L3_BENE1>W238453-01OCT20</DTE_TC1_L3_BENE1>
            <DTE_TC1_L3_AMA1>W238454-01OCT20</DTE_TC1_L3_AMA1>
            <DTE_TC1_L3_SI1>W238455-01OCT20</DTE_TC1_L3_SI1>
            <DTE_TC1_L3_TOA1>W238457-01OCT20</DTE_TC1_L3_TOA1>
            <DTE_TC1_L3_TOA2>W238458-01OCT20</DTE_TC1_L3_TOA2>
            <DTE_TC1_L3_TOA3>W238456-01OCT20</DTE_TC1_L3_TOA3>
        </Account1>
        <Account2>
```

```
            <Signer_FirstName>Chris</Signer_FirstName>
            <Signer_MiddleName>dummy</Signer_MiddleName>
            <Signer_LastName>Addison</Signer_LastName>
            <Phone_No>3156403350</Phone_No>
            <Confirm_No>CNF54223222JUL20UAT</Confirm_No>
            <Account_No>637129246</Account_No>

<DTE_XTRAC_LoginCookie>144433624098407336863374722710467509 83
</DTE_XTRAC_LoginCookie>
            <DTE_TC1_L1>W237535-30SEP20</DTE_TC1_L1>
            <DTE_TC1_L2_ES1>W919707-08DEC20</DTE_TC1_L2_ES1>
            <DTE_TC1_L3_AO1>W919708-08DEC20</DTE_TC1_L3_AO1>
            <DTE_TC1_L3_PB1>W919709-08DEC20</DTE_TC1_L3_PB1>
            <DTE_TC1_L3_TCP1>W919710-08DEC20</
DTE_TC1_L3_TCP1>
            <DTE_TC1_L3_TCP2>W238752-01OCT20</
DTE_TC1_L3_TCP2>
            <DTE_TC1_L3_TCP3>W237553-Dummy</DTE_TC1_L3_TCP3>
            <DTE_TC1_L3_BENE1>W238753-01OCT20</
DTE_TC1_L3_BENE1>
            <DTE_TC1_L3_AMA1>W238454-01OCT20</
DTE_TC1_L3_AMA1>
            <DTE_TC1_L3_SI1>W238855-01OCT20</DTE_TC1_L3_SI1>
            <DTE_TC1_L3_TOA1>W239457-01OCT20</
DTE_TC1_L3_TOA1>
            <DTE_TC1_L3_TOA2>W238658-01OCT20</
DTE_TC1_L3_TOA2>
            <DTE_TC1_L3_TOA3>W238956-01OCT20</
DTE_TC1_L3_TOA3>
        </Account2>
        <STATUS>
            <ServiceCenter>HO Approved</ServiceCenter>
            <ESIG>Signed 5 signers</ESIG>
            <FDOT>Validated<FDOT>>
        </STATUS>
    </Test>
```

```xml
<Test Name="E2E_IGO" Status="Run">
        <Signer_FirstName>ZMXJL</Signer_FirstName>
        <Signer_LastName>SIDW</Signer_LastName>
        <Confirm_No>CNF54223222JUL25UAT</Confirm_No>
        <Account_No>637129445</Account_No>
        <PREFERREDNAME>JD</PREFERREDNAME>
        <Phone_Number>(984)242-6506</Phone_Number>

<DTE_XTRAC_LoginCookie>14443362409840738886337472271046750777
</DTE_XTRAC_LoginCookie>
        <DTE_TC1_L1>W237535-30SEP20</DTE_TC1_L1>
        <DTE_TC1_L2_ES1>W919707-08DEC25</DTE_TC1_L2_ES1>
        <DTE_TC1_L3_AO1>W919708-08DEC25</DTE_TC1_L3_AO1>
        <DTE_TC1_L3_PB1>W919709-08DEC25</DTE_TC1_L3_PB1>
        <BankAccount_Number>92301162456</BankAccount_Number>
        <Account_Type>Checking</Account_Type>
  </Test>
</SystemsTeam_XML>
```

FIG. 6

SYSTEMS AND METHODS FOR AN END-TO-END AUTOMATION FRAMEWORK

CROSS REFERENCE TO RELATED APPLICATION

This application claims the benefit of and priority to U.S. Provisional Patent Application No. 63/155,018, filed Mar. 1, 2021, the entire contents of which are owned by the assignee of the instant application and incorporated herein by reference in their entirety.

FIELD OF THE INVENTION

The present invention relates generally to systems and methods for application software testing, including systems and methods for implementing automation frameworks for software testing.

BACKGROUND OF THE INVENTION

Software testing involves executing a program or application in order to verify that the software product is fit for use. Automation frameworks are one of many tools used by developers during software testing. For a particular software product, there are often several automation frameworks or tools that are used for testing. For example, for some software products, there are a large number of systems and sub-systems to be validated end-to-end, and it becomes important to pick the automation framework which suits the needs of the system or sub-system.

For example, an end-to-end test scenario may start from the front end, flows through various services and microservices, and then is routed to legacy systems for complex calculations and record keeping. Often, data is stored in various databases. The challenge in automating these kinds of end-to-end testing scenarios is dealing with multiple systems which may use various automation tools. For example, migration of one framework to another framework can be time consuming and difficult, and often ends up being tested manually. Manual testing can be a bottle neck in fast development lifecycles, and is error prone.

However, finding a single automation framework which suits the needs of all the systems and sub-systems can be challenging. A multitude of different automation frameworks are often required, and this increases the complexity and maintenance effort during software testing. For example, framework selection criteria can include several factors such as cost, efficiency, and feasibility. Therefore, there is a need for an end-to-end system automation implementation in order to reduce software testing time.

SUMMARY OF THE INVENTION

Accordingly, an object of the invention is to provide systems and methods for implementing an end-to-end automation framework. For example, it is an object of the invention to provide systems and methods for initiating one or more automation frameworks corresponding to one or more applications. It is an object of the invention to provide systems and methods for storing data generated from an automation framework in a data file. It is an object of the invention to provide systems and methods for generating data from an automation framework based on stored data in a data file. It is an object of the invention to provide systems and methods for generating a data log based on stored data in a data file.

In some aspects, a computerized method for implementing an end-to-end automation framework includes receiving a testing data file associated with one or more applications. The method further includes initiating a first automation framework corresponding to a first application. For example, in some embodiments, the first automation framework includes an application programming interface. The method also includes storing first data generated from the first automation framework in a data file. In some embodiments, the data file is one of an XML file or a JSON file.

The method further includes initiating a second automation framework corresponding to a second application. In some embodiments, the also includes determining a first status of the first automation framework based on the first data. For example, in some embodiments, the method also includes, in response to determining the first status, initiating the second automation framework. Further, the method includes storing second data generated from the second automation framework based on at least the first data in the data file. The method also includes generating a data log based on the data file. Further, the method includes generating for display the data log on a user device. In some embodiments, the method also includes storing the data file in the database.

In some embodiments, the method further includes determining a second status of the second automation framework based on the second data. For example, in some embodiments, the method also includes, in response to determining the second status, initiating a third automation framework corresponding to a third application. In some embodiments, the method further includes generating third data from the third automation framework based on at least the first data and the second data in the data file. For example, in some embodiments, the method also includes storing the third data in the data file.

In some aspects, a system for implementing an end-to-end automation framework includes a server computing device communicatively coupled to a user device and a database over a network. The server computing device is configured to receive a testing data file associated with applications. The server computing device is also configured to initiate a first automation framework corresponding to a first application. For example, in some embodiments, the first automation framework includes an application programming interface. Further, the server computing device is configured to store first data generated from the first automation framework in a data file. In some embodiments, the data file is one of an XML file or a JSON file.

The server computing device is also configured to initiate a second automation framework corresponding to a second application. In some embodiments, the server computing device is configured to determine a first status of the first automation framework based on the first data. For example, in some embodiments, the server computing device is configured to, in response to determining the first status, initiate the second automation framework. Further, the server computing device is configured to store second data generated from the second automation framework based on at least the first data in the data file. The server computing device is also configured to generate a data log based on the data file. Further, the server computing device is configured to generate for display the data log on the user device. In some embodiments, the server computing device is configured to store the data file in the database.

In some embodiments, the server computing device is configured to determine a second status of the second automation framework based on the second data. For example, in some embodiments, the server computing device is configured to, in response to determining the second status, initiate a third automation framework corresponding to a third application. In some embodiments, the server computing device is configured to generate third data from the third automation framework based on at least the first data and the second data in the data file. For example, in some embodiments, the server computing device is configured to store the third data in the data file.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram showing an exemplary visualization of a data file for storing data generated from an automation framework, according to embodiments of the technology described herein.

FIG. 6 is a diagram showing an exemplary visualization of a data file for storing data generated from an automation framework, according to embodiments of the technology described herein.

DETAILED DESCRIPTION OF THE INVENTION

The systems and methods described herein can enable implementation of an end-to-end automation framework. For example, in some aspects, the systems and methods described herein can include one or more mechanisms or methods for initiating one or more automation frameworks corresponding to one or more applications. The system and methods can include mechanisms or methods for storing data generated from an automation framework in a data file. The systems and methods described herein can provide mechanisms or methods for generating data from an automation framework based on stored data in a data file. The systems and methods described herein can provide mechanisms or methods for generating a data log based on stored data in a data file.

Figure 1:
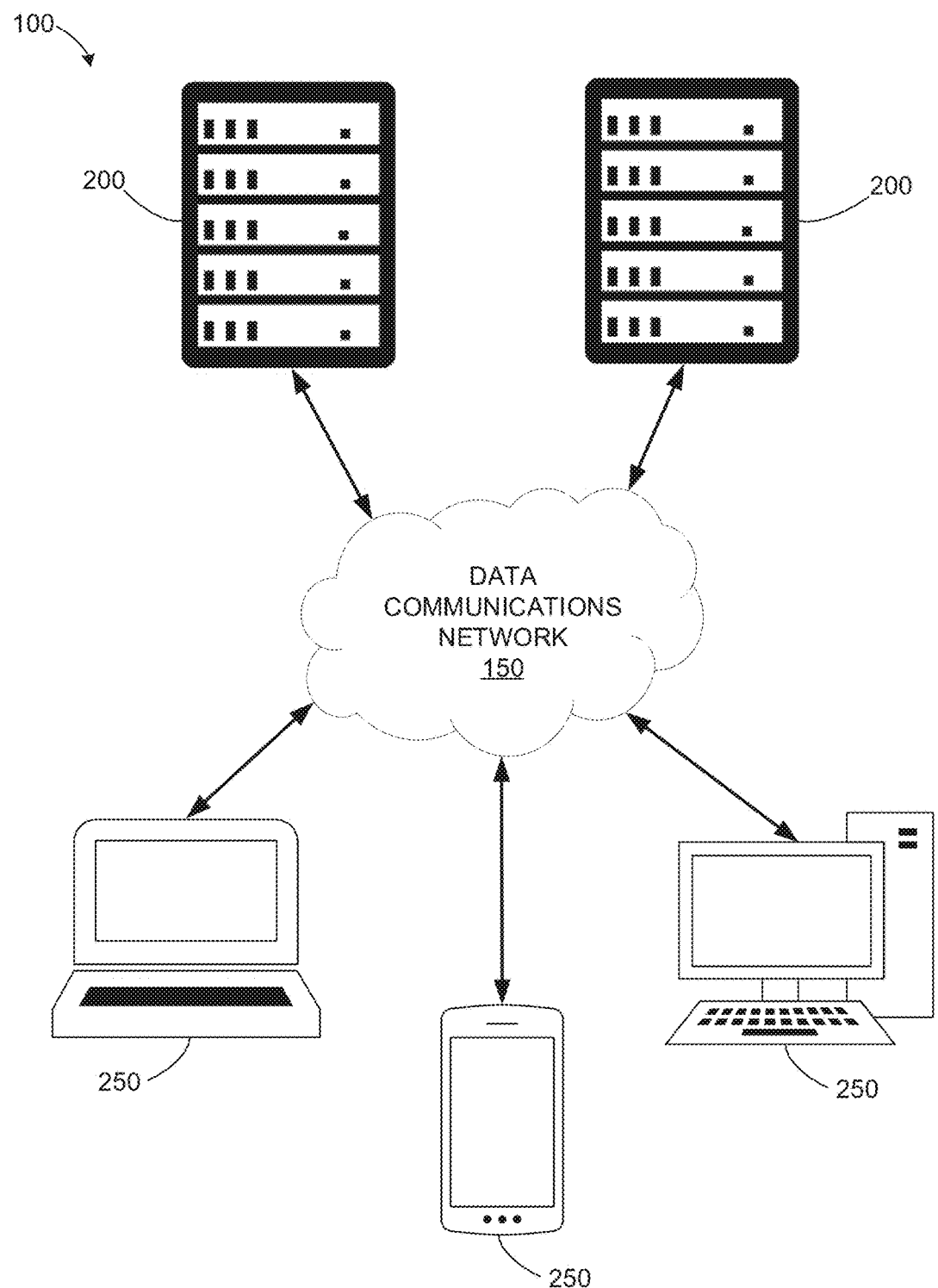
FIG. 1 is a block diagram of an exemplary data communications network, according to embodiments of the technology described herein.
Figure 2:
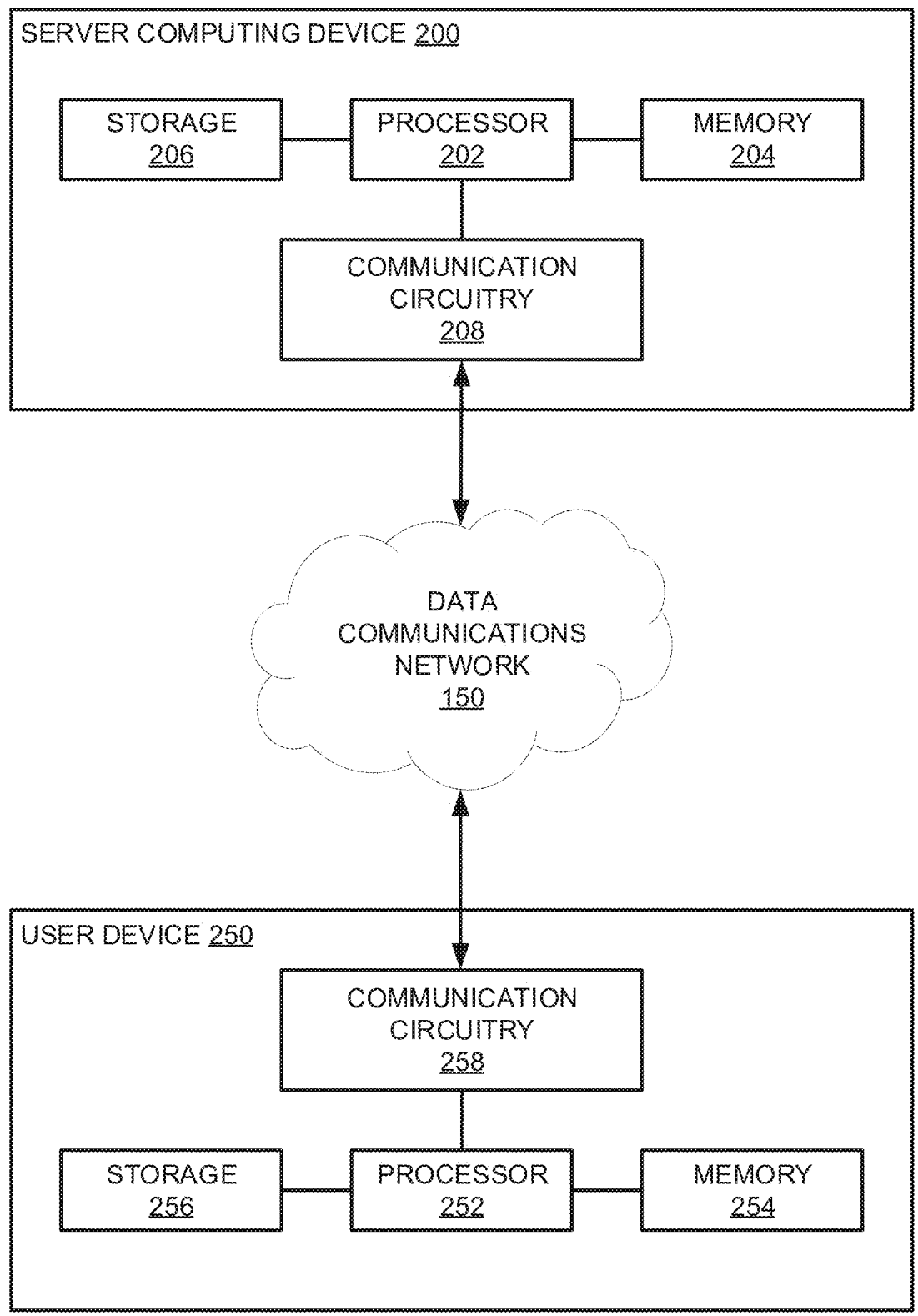
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

The systems and methods described herein provide an end-to-end automation framework that can be implemented to integrate several different automation frameworks using a single data structure into one streamlined workflow. The systems and methods described herein can include integration via Jenkins jobs and the input/output data structure via an XML file. In some embodiments, this file can be used to share input/output parameters between the automation frameworks. For example, in some embodiments, a parent Jenkins job can control the execution of child jobs and their precedency with each child job having access to dynamically defined data from XML and statically defined data from their own framework.

Figure 3:
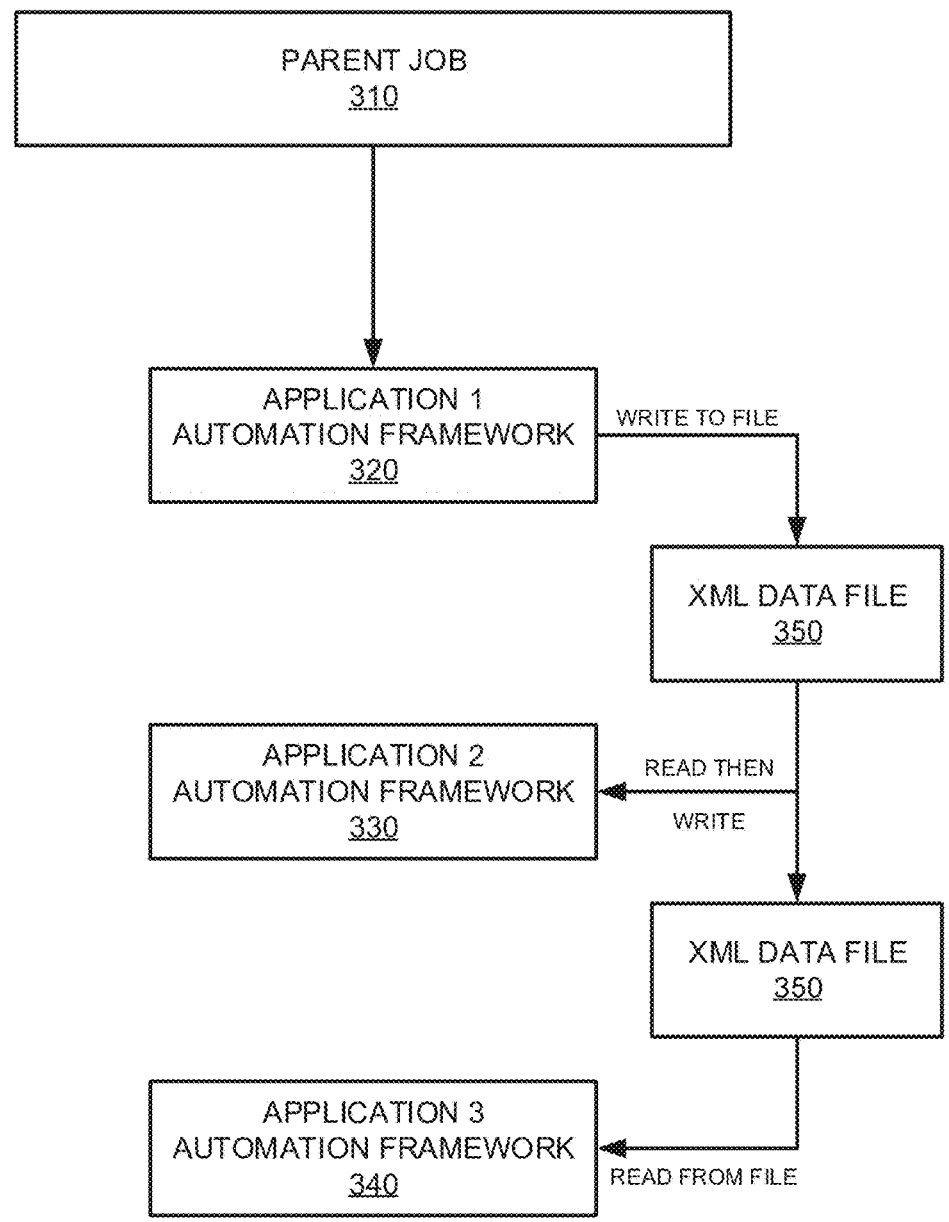
FIG. 3 is a diagram of an exemplary process for integrating multiple automation frameworks, according to embodiments of the technology described herein.

The systems and methods described herein can be implemented for software testing purposes such as testing web applications, webservices, mainframe applications, WPF applications, and desktop applications. Examples of automation frameworks or tools include HP-UFT, Selenium, Cucumber Serenity, SoapUI, RESTAPI, Parasoft, and others. Each tool can serve a different purpose for automating applications under test. For example, FIG. 3 illustrates a process 300 for integrating multiple automation frameworks. Process 300 can be implemented on a system using communications system 100 and server computing device 200.

As shown, process 300 begins with parent job 310 triggering different automation frameworks 320, 330, and 340. Each automation framework corresponds to a particular application. For example, automation framework 320 can be associated with application 1, automation framework 330 can be associated with application 2, and automation framework 340 can be associated with application 3. Once parent job 310 triggers the first automation framework 320, automation framework 320 generates and stores dynamic data to an XML data file 350. The second automation framework 330 can then read from the XML data file 350 and leverage the dynamic data stored in XML data file 350 generated by the first automation framework 320. The second automation framework 330 then generates new dynamic data to be added and stored in XML data file 350 to be accessed and leveraged by the third automation framework 340.

Figure 4:
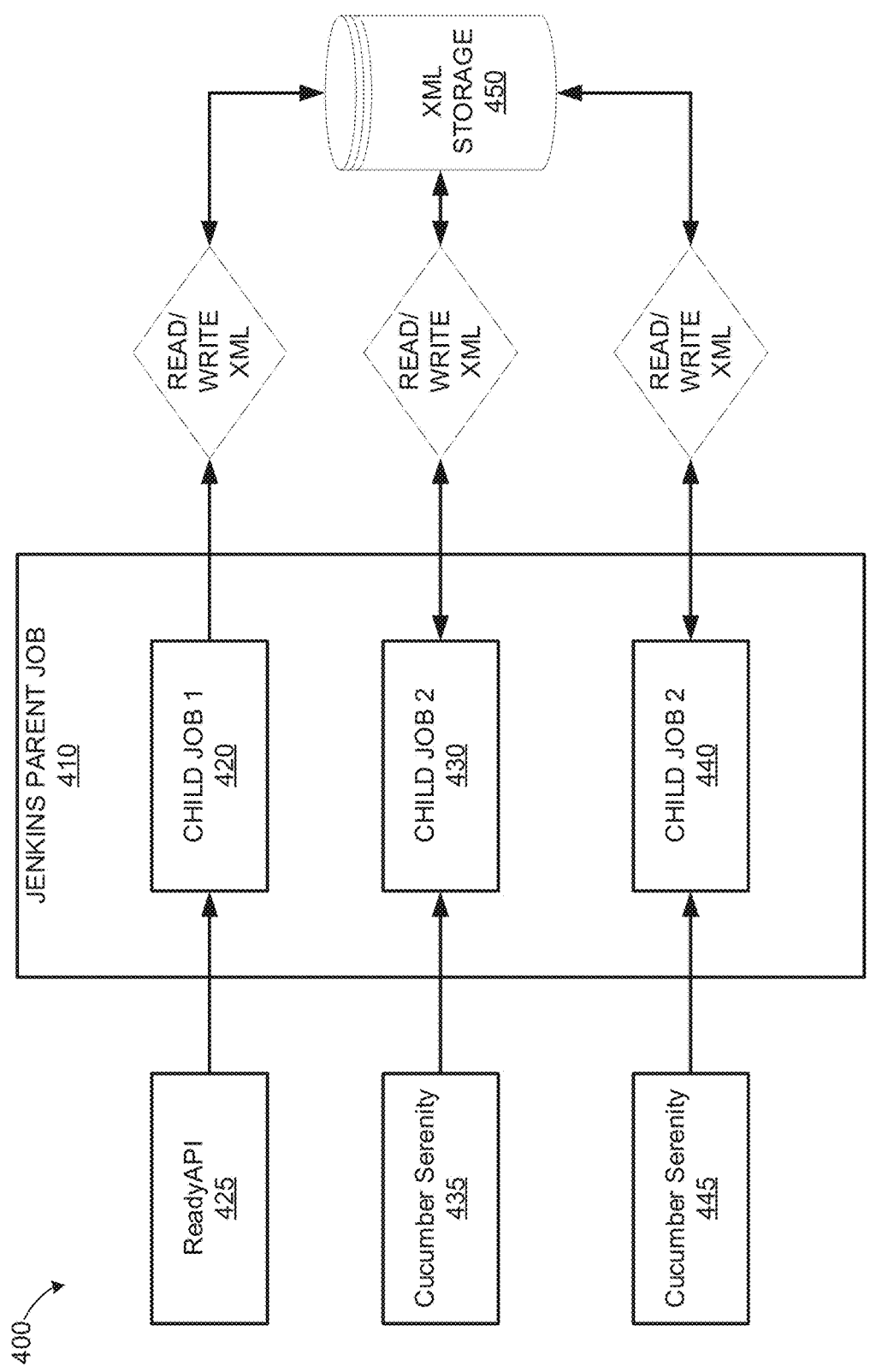
FIG. 4 is a diagram showing an exemplary embodiment of a process for integrating multiple automation frameworks, according to embodiments of the technology described herein.

FIG. 4 illustrates an exemplary embodiment 400 of the systems and methods described herein. For example, exemplary embodiment 400 uses a parent and child job configuration using Jenkins. The configuration includes an XML file stored at XML storage 450, including XML data tags used to share data between automation frameworks. In some embodiments, a Jenkins parent job 410 with subsequent child jobs 420, 430, and 440 triggers different automation executions. The child jobs can leverage the XML files which are stored in a remote location. Once the Jenkins job 410 is initiated, a set of automation scripts kick off. In this example, the first Jenkins child job 420 triggers the ReadyAPI automation framework 425, which can write dynamic data to the XML file stored at XML storage 450. The second child job 430 can trigger the Cucumber Serenity automation framework 435, which leverages the XML tags stored dynamically from child job one 420, and writes output values to the XML file so it can be further used by subsequent jobs. For example, the third child job 440 can trigger the Cucumber Serenity automation framework 445, and writes output values to the XML file so it can be further used by subsequent jobs.

In general, each child job can read or write data to or from the XML file. Each child job represents a separate automation framework such as UFT, Selenium, Cucumber Serenity, and so on. Process 400 demonstrates multiple types of automation frameworks triggering and dynamic data sharing between different automation frameworks with the use of an XML file. FIGS. 5 and 6 illustrate exemplary visualizations of a data file for storing data generated from an automation framework. For example, FIG. 5 illustrates an exemplary XML block 500 demonstrating XML hierarchy and FIG. 6 illustrates an exemplary XML block 600 demonstrating the use of distinct tags.

Figure 7:
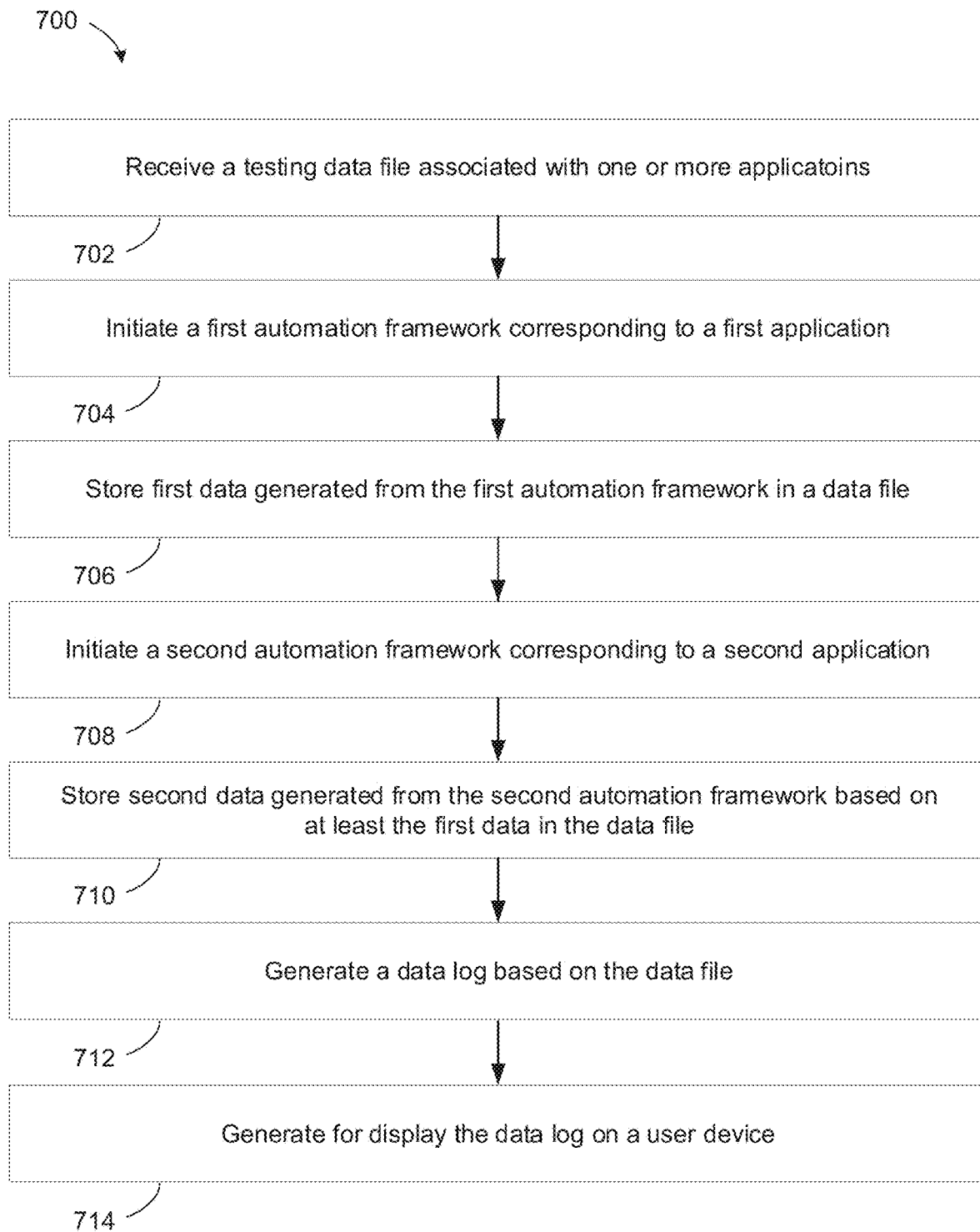
FIG. 7 is a flow diagram of a computer-implemented method for implementing an end-to-end automation framework, according to embodiments of the technology described herein.

Referring to FIG. 7, a process 700 for implementing an end-to-end automation framework is illustrated. The process 700 begins by receiving, by a server computing device 200, a testing data file associated with one or more applications in step 702. Process 700 continues by initiating, by the server computing device 200, a first automation framework 320 corresponding to a first application in step 704. For example, in some embodiments, the first automation framework 320 includes an application programming interface. Process 700 continues by storing, by the server computing device 200, first data generated from the first automation framework 320 in a data file 350 in step 706. For example, in some embodiments, the data file 350 is one of an XML file or a JSON file.

Process 700 continues by initiating, by the server computing device 200, a second automation framework 330 corresponding to a second application in step 708. In some embodiments, the server computing device 200 is configured to determine a first status of the first automation framework 320 based on the first data. For example, in some embodiments, the server computing device 200 is configured to, in response to determining the first status, initiate the second automation framework 330. Process 700 continues by storing, by the server computing device 200, second data generated from the second automation framework 330 based on at least the first data in the data file 350 in step 710. Process 700 continues by generating, by the server computing device 200, a data log based on the data file 350 in step 712. Process 700 finishes by generating, by the server computing device 200, for display the data log on a user device 250 in step 714. In some embodiments, the server computing device 200 is configured to store the data file 350 in a database 450.

In some embodiments, process 700 further includes determining, by the server computing device 200, a second status of the second automation framework 330 based on the second data. For example, in some embodiments, process 700 also includes, in response to determining the second status, initiating, by the server computing device 200, a third automation framework 340 corresponding to a third application. In some embodiments, process 700 further includes generating, by the server computing device, third data from the third automation framework 340 based on at least the first data and the second data in the data file 350. For example, in some embodiments, process 700 also includes storing the third data in the data file 350.

In some aspects, process 700 can be implemented on a system for implementing an end-to-end automation framework. The system includes a server computing device 200 communicatively coupled to a user device 250 and a database 450 over a network 150. The server computing device 200 is configured to receive a testing data file associated with one or more applications. The server computing device 200 is also configured to initiate a first automation framework 320 corresponding to a first application. For example, in some embodiments, the first automation framework 320 includes an application programming interface. Further, the server computing device 200 is configured to store first data generated from the first automation framework in a data file 350. In some embodiments, the data file is one of an XML file or a JSON file.

The server computing device 200 is also configured to initiate a second automation framework 330 corresponding to a second application. In some embodiments, the server computing device 200 is configured to determine a first status of the first automation framework 320 based on the first data. For example, in some embodiments, the server computing device 200 is configured to, in response to determining the first status, initiate the second automation framework 330. Further, the server computing device 200 is configured to store second data generated from the second automation framework 330 based on at least the first data in the data file 350. The server computing device 200 is also configured to generate a data log based on the data file 350. Further, the server computing device 200 is configured to generate for display the data log on the user device 250. In some embodiments, the server computing device 200 is configured to store the data file 350 in the database 450.

In some embodiments, the server computing device 200 is configured to determine a second status of the second automation framework 330 based on the second data. For example, in some embodiments, the server computing device 200 is configured to, in response to determining the second status, initiate a third automation framework 340 corresponding to a third application. In some embodiments, the server computing device 200 is configured to generate third data from the third automation framework 340 based on at least the first data and the second data in the data file 350. For example, in some embodiments, the server computing device 200 is configured to store the third data in the data file 350.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for implementing an end-to-end automation framework, the method comprising:
    receiving, by a server computing device, a testing data file associated with a plurality of applications;
    initiating, by the server computing device, a parent testing job that controls a plurality of child testing jobs, each child testing job associated with a different automation framework;
    triggering, by the server computing device, a first child testing job to initiate a first automation framework corresponding to a first application of the plurality of applications;
    storing, by the server computing device, first data generated from the first automation framework in a structured data file, the first data tagged with an identifier specific to the first automation framework;
    triggering, by the server computing device, a second child testing job to initiate a second automation framework corresponding to a second application of the plurality of applications, the second automation framework extracting one or more tagged elements of the first data stored in the data file as input for execution of the second automation framework;
    storing, by the server computing device, second data generated from the second automation framework in the structured data file, the second data tagged with an identifier specific to the second automation framework and arranged in a hierarchy with at least the first data in the structured data file;
    generating, by the server computing device, a data log based on the data file; and
    generating, by the server computing device, for display the data log on a user device.

2. The computerized method of claim 1, wherein the structured data file comprises one of an XML file or a JSON file.

3. The computerized method of claim 1, wherein the server computing device determines a first status of the first automation framework based on the first data.

4. The computerized method of claim 3, wherein, in response to determining the first status, the server computing device triggers the second child testing job to initiate the second automation framework.

5. The computerized method of claim 1, wherein the server computing device determines a second status of the second automation framework based on the second data.

6. The computerized method of claim 5, wherein, in response to determining the second status, the server computing device triggers a third child testing job to initiate a third automation framework corresponding to a third application of the plurality of applications, the third automation framework extracting one or more tagged elements of the first data and second data stored in the data file as input for execution of the third automation framework.

7. The computerized method of claim 6, wherein the server computing device generates third data from the third automation framework based on at least the first data and the second data in the structured data file.

8. The computerized method of claim 7, wherein the server computing device stores the third data in the data file, the third data tagged with an identifier specific to the third automation framework and arranged in a hierarchy with at least the first data and the second data in the structured data file.

9. The computerized method of claim 1, wherein the first automation framework comprises an application programming interface.

10. The computerized method of claim 1, wherein the server computing device stores the data file in a database.

11. A system for implementing an end-to-end automation framework, the system comprising a server computing device communicatively coupled to a user device and a database over a network, the server computing device comprising a memory for storing computer-executable instructions and a processor that executes the computer-executable instructions to:
    receive a testing data file associated with a plurality of applications;
    initiate a parent testing job that controls a plurality of child testing jobs, each child testing job associated with a different automation framework;
    trigger a first child testing job to initiate a first automation framework corresponding to a first application of the plurality of applications;
    store first data generated from the first automation framework in a structured data file, the first data tagged with an identifier specific to the first automation framework;
    trigger a second child testing job to initiate a second automation framework corresponding to a second application of the plurality of applications, the second automation framework extracting one or more tagged elements of the first data stored in the data file as input for execution of the second automation framework;
    store second data generated from the second automation framework in the structured data file, the second data tagged with an identifier specific to the second automation framework and arranged in a hierarchy with at least the first data in the structured data file;
    generate a data log based on the data file; and
    generate for display the data log on the user device.

12. The system of claim 11, wherein the structured data file comprises one of an XML, file or a JSON file.

13. The system of claim 11, wherein the server computing device determines a first status of the first automation framework based on the first data.

14. The system of claim 13, wherein, in response to determining the first status, the server computing device triggers the second child testing job to initiate the second automation framework.

15. The system of claim 11, wherein the server computing device determines a second status of the second automation framework based on the second data.

16. The system of claim 15, wherein, in response to determining the second status, the server computing device triggers a third child testing job to initiate a third automation framework corresponding to a third application of the plurality of applications, the third automation framework extracting one or more tagged elements of the first data and second data stored in the data file as input for execution of the third automation framework.

17. The system of claim 16, wherein the server computing device generates third data from the third automation framework based on at least the first data and the second data in the structured data file.

18. The system of claim 17, wherein the server computing device stores the third data in the data file, the third data tagged with an identifier specific to the third automation framework and arranged in a hierarchy with at least the first data and the second data in the structured data file.

19. The system of claim 11, wherein the first automation framework comprises an application programming interface.

20. The system of claim 11, wherein the server computing device stores the data file in the database.

\* \* \* \* \*